United States Patent [19]

Nakamura et al.

[11] 4,236,493
[45] Dec. 2, 1980

[54] EGR CONTROL SYSTEM

[75] Inventors: Ken Nakamura, Kawasaki; Yasuo Nakajima, Yokosuka; Hiromichi Ofuji, Yokohama; Eiji Murata, Yokosuka, all of Japan

[73] Assignee: Nissan Motor Company, Limited, Yokohama, Japan

[21] Appl. No.: 43,831

[22] Filed: May 30, 1979

[30] Foreign Application Priority Data

Jun. 1, 1978 [JP] Japan .................................. 53/66458

[51] Int. Cl.³ .......................................... F02M 25/06
[52] U.S. Cl. ................................................... 123/568
[58] Field of Search ..................................... 123/119 A

[56] References Cited

U.S. PATENT DOCUMENTS

| | | | |
|---|---|---|---|
| 3,791,144 | 2/1974 | Lang | 123/119 A |
| 4,069,797 | 1/1978 | Nohira et al. | 123/119 A |
| 4,071,003 | 1/1978 | Aono | 123/119 A |
| 4,090,482 | 5/1978 | Yoshida | 123/119 A |
| 4,164,208 | 8/1979 | Okitsu et al. | 123/119 A |

*Primary Examiner*—Wendell E. Burns

[57] ABSTRACT

An EGR control system includes a plurality of ON-OFF air valves to control the amount of air admitted into a control passage extending from a source of constant vacuum to a control vacuum chamber upon which an EGR control valve is operated. The air valves are selectively energized by a controller containing a microcomputer wherein an exhaust gas control strategy is stored.

8 Claims, 5 Drawing Figures

EGR CONTROL SYSTEM

BACKGROUND OF THE INVENTION

The present invention relates to an exhaust gas recirculation (EGR) control system for an automotive internal combustion engine.

Exhaust gas recirculation is effective in reducing the emission of nitrogen oxides (NOx) wherein it is necessary, in order to lower NOx level effectively without deteriorating driveability, to control the amount of flow of exhaust gas recirculation in dependence upon the amount of flow of intake air, and it is also necessary to decrease the amount of EGR flow temporarily under high speed low load and operating condition for the purpose of improving the fuel economy.

BRIEF DESCRIPTION OF THE DRAWINGS

The description will hereinafter proceeds in connection with the accompanying drawings, for ease of understanding. In the accompanying drawings.

DESCRIPTION OF THE PRIOR ART

Figure 1:
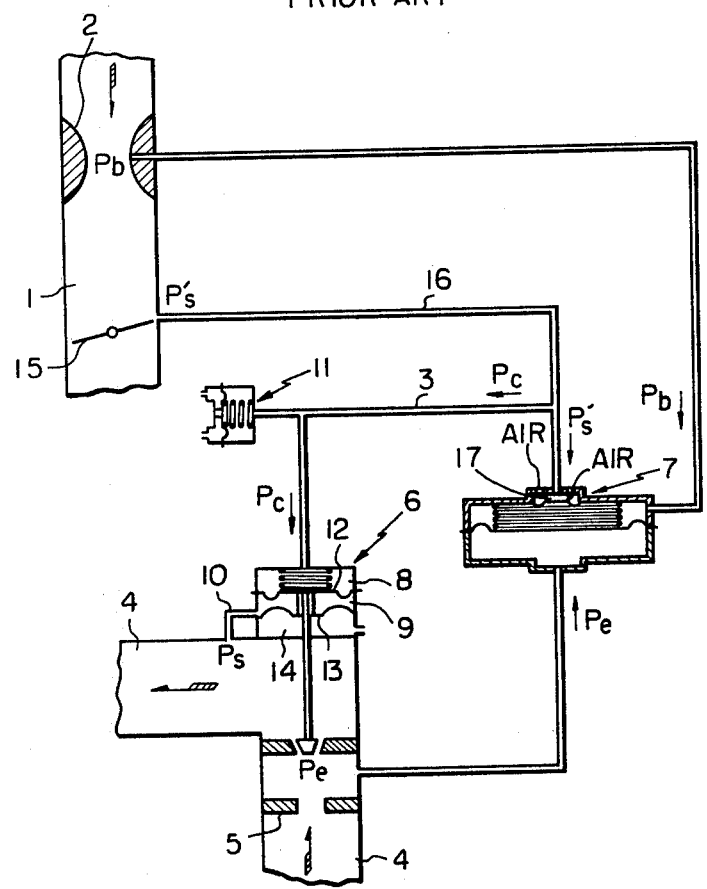
FIG. 1 is a schematic view of an exhaust gas recirculation control system according to the prior art.

Referring to FIG. 1 EGR control system according to the prior art, an EGR control valve 6 is arranged downstream of an orifice 5 within an EGR passage 4 which leads from an exhaust system to an intake system to recirculate a portion of exhaust gas from the exhaust to intake systems. The EGR control system includes a vacuum modulator 7 which includes a vacuum regulating chamber 17 adapted to communicate with an intake passage 1 via a passage 16 opening into the intake passage 1 at a position upstream and in the vicinity of a closed position (the idle speed position) of a throttle valve 15 to receive an intake passage vacuum P's (VC vacuum). Based on this vacuum the vacuum modulator 7 produces a control vacuum Pc in response to a difference between the magnitude of venturi vacuum Pb at a venturi 2 and the magnitude of exhaust pressure Pe within the illustrated zone downstream of the orifice 5. The EGR control system also includes a relief valve 11 to define the maximum magnitude of the control vacuum Pc upon which the EGR control valve 6 operates. The EGR control valve 6 operates also upon a manifold vacuum Ps introduced into a compensation chamber 9 via a passage 10. The compensation chamber 9 is defined between two diaphragms 12 and 13 which divide a housing of the EGR control valve 6 into three chambers, the upper one being used as the control vacuum chamber 8, the middle one as the compensation chamber 9 and the lower one as an atmospheric chamber 14.

A problem with the EGR control system depicted in FIG. 1 is in the complicated construction of the EGR control valve 6 since the EGR control valve operates not only upon the control vacuum Pc but also upon the manifold vacuum Ps. Another problem with this EGR control system is derived from the provision of the vacuum modulator 7 and the relief valve 11 and in that there is a limit to precision control of EGR flow rate and system response can not be increased sufficiently.

Another known EGR control system employs one solenoid operable air valve in order to optimize the magnitude of a control vacuum upon which an EGR control valve operates, wherein by varying the ON-OFF ratio of the solenoid valve the magnitude of the control vacuum is optimized.

A problem with this is in the durability of the solenoid operable air valve because it cyclically opens and closes when in operation. Another problem is that a complicated controller is required for varying the ON-OFF ratio of the solenoid operable air valve.

SUMMARY OF THE INVENTION

According to the present invention, an exhaust gas recirculation control system includes an exhaust gas recirculation control valve which varies the amount of flow of exhaust gas recirculation in response to the magnitude of a control vacuum within a control vacuum chamber thereof, a source of vacuum communicating with the control vacuum chamber, a control passage means providing communication between the source of vacuum and said control vacuum chamber, the control passage means being formed with a plurality of holes which are spaced with each other in a longitudinal direction of the control passage means, and a plurality of ON-OFF valves to open and close said holes of said control passage means, respectively. With this arrangement of said holes of the control passage means, each state of of the ON-OFF valves corresponds to one value in the magnitude of the control vacuum within the control vacuum chamber of the exhaust gas recirculation control valve so that, where, n denotes the number of the ON-OFF valves, $2^n$ different states may be taken by the ON-OFF valves, so $2^n$ different values may be taken by the control vacuum correspondingly. The magnitude of the control vacuum can change from one to another value in response to a change of the ON-OFF valves from one to another state so that system response increases. Since the amount of air flow admitted into the control passage means changes from one to another value in response to a change of the plurality of ON-OFF valves from one to another state, these ON-OFF valves are free from the durability problem.

Accordingly one object of the present invention is to provide an exhaust gas recirculation control system which employs a simple, in construction, exhaust gas recirculation control valve, which is free from the durability problem and which can increase system response of an exhaust gas recirculation system.

Further object of the present invention is to provide an exhaust gas recirculation control system which provides precision exhaust gas recirculation flow control with small number of ON-OFF valves.

DESCRIPTION OF THE EMBODIMENT

Figure 2:
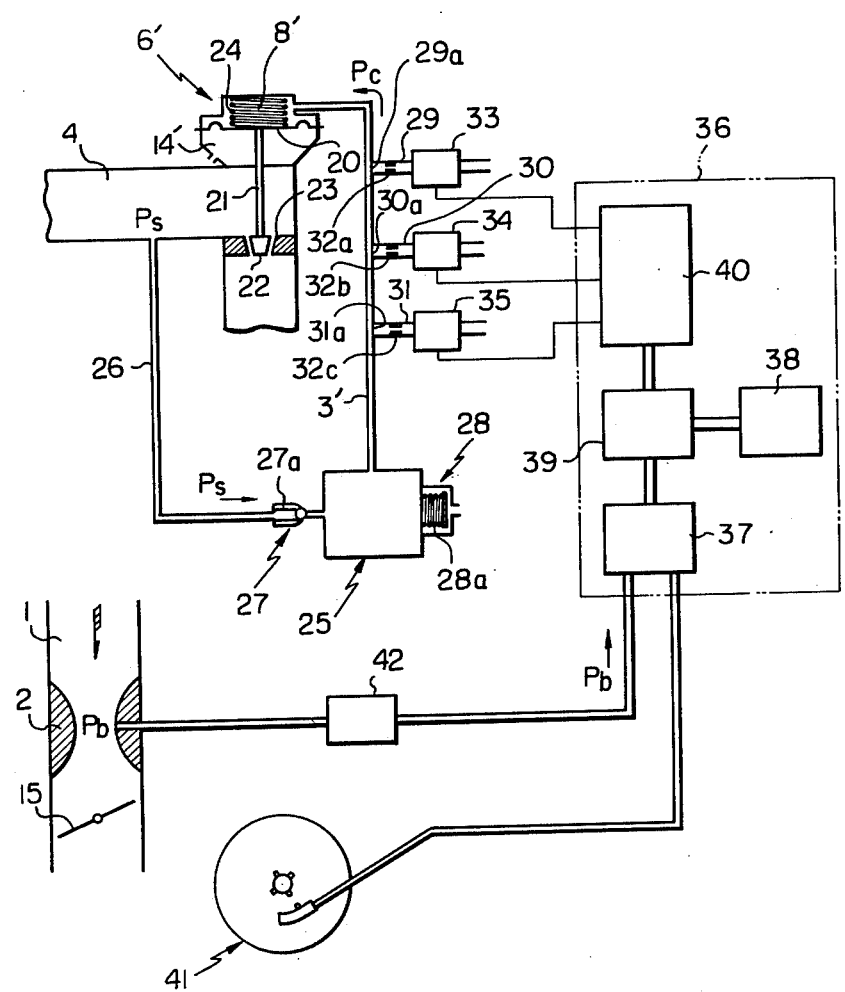
FIG. 2 is a schematic view of an exhaust gas recirculation control system according to the present invention in association with a controller shown in block diagram.

Referring to FIG. 2, an embodiment of an exhaust gas recirculation control system according to the present invention is depicted wherein a manifold vacuum Ps within an exhaust gas recirculation passage 4 is used, operating condition of an internal combustion engine is detected by sensing the engine rpm and venturi vacuum Pb of an intake passage 1, and three sets, each set including an orifice and an ON-OFF air valve, are provided.

Denoted by the reference numeral 6' is an exhaust gas recirculation control valve which is arranged in a known manner with respect to the EGR passage 4 so that it can control flow resistance within the EGR passage so as to control the amount of flow of EGR gas. The EGR control valve 6' comprises a diaphragm 20 which divides a housing into two chambers, one serving as a control vacuum chamber 8', the other serving as an atmospheric chamber 14'. A valve member 22 is fixed through a valve stem 21 to the diaphragm 20 and coopertes with a valve seat of a valve plate 23, transversely mounted within the EGR passageway 4. Within the control vacuum chamber 8' is arranged a return spring in abutting engagement with the diaphragm 20 to provide a suited bias against the movement of said diaphragm 20 as the magnitude of vacuum within the control vacuum chamber 8' increases.

A control passage 3' provides communication between the control vacuum chamber 8' and a source of constant vacuum in the form of a surge tank 25 posessing a pressure regulating function. This surge tank communicates with the EGR passage 4 through a vacuum introduction passage 26 to receive manifold vacuum Ps. The surge tank 25 has a volume large enough to hold the magnitude of vacuum therein at a constant value. Denoted by the reference numeral 27 is a check valve provided in the vacuum introduction passage 26, while, denoted by the reference numeral 28 is an air valve directly mounted to the surge tank 25. The check valve 27 and air valve 28 cooperate with each other to perform the pressure regulating function. The check valve 27 opens when the magnitude of the manifold vacuum is larger than a preset value determined by a constant pressure spring 27a to allow the manifold vacuum Ps into the surge tank 25. The air valve 28 opens when the magnitude of vacuum within the surge tank 25 is relatively large to allow atmospheric air into the surge tank, thus decreasing the vacuum within the surge tank. For the reason as above, the vacuum within the surge tank 25 is maintained at the constant value.

Referring to a plurality, three in this embodiment, although not limited to this number, of air passages 29, 30, 31 which are branched off from the control passage 3' at holes 29a, 30a, 31a thereof they are provided with flow restricting orifices 32a, 32b, 32c, respectively, and with ON-OFF air valves 33, 34, 35, respectively. The number of air passages corresponds to the number of the ON-OFF air valves. The provision of the orifices 32a, 32b, 32c within the corresponding air passages may be eliminated if it is possible to provide each of the ON-OFF air valves with flow restricting function.

Since each ON-OFF valve can taken ON position and OFF position, the number of available states which can be taken by three ON-OFF valves 33, 34, 35 will be expressed as $2^3$. Hence, the number of available states which can be taken by a plurality of ON-OFF valves can be given as $2^n$, where: n denotes the number of the ON-OFF valves.

The arrangement of the holes 29a, 30a, 31a and the effective flow area of each of these holes, which is determined by the orifice size, an such that each state of the ON-OFF valves corresponds to one value in the magnitude of the control vacuum Pc, conversely, each value taken by the control vacuum Pc corresponds to one state of the ON-OFF valves. Therefore, $2^3$ different values may be taken by the control vacuum Pc correspondingly to $2^3$ different states of three ON-OFF valves 32a, 32b, 32c. because the holes 29a, 30a, 31a are spaced with each other in a longitudinal direction of the control passage 3' in a similar manner as tone holes of a cylindrical bore flute.

The number of the ON-OFF valves may be increased from two in accordance with the precision degree required for the EGR flow rate.

With regard to the size of each orifice, the orifices may have a common orifice size or different orifice sizes. Values in the magnitude of the control vacuum Pc differ in the case different orifice sizes are selected from the case wherein the common orifice size is selected.

Figure 3:
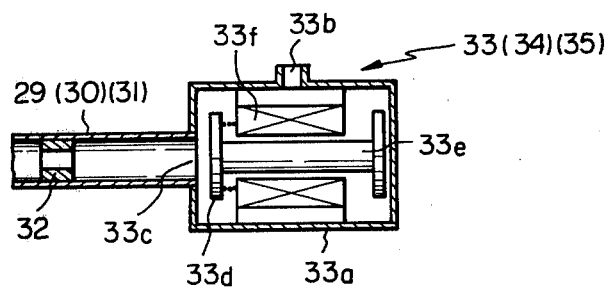
FIG. 3 is a sectional view of an ON-OFF valve which may be usable in FIG. 2.

The construction of the ON-OFF valves 33, 34, 35 may take any form as long as it can permit automatic open and close control of the valve thereof. FIG. 3 depicts, as an example of such constructions, a solenoid operable ON-OFF valve. Referring to this Figure, a housing 33a of an ON-OFF air bleed valve 33 (or 34 or 35), which is coupled with the corresponding air bleed passage 29 (or 30 or 31), has an air port 33b. Within the valve housing 33a a spool 33e, having at one end thereof a valve member 33d positioned so as to open and close a valve port 33c, is reciprocally movably mounted, and a solenoid 33f is mounted for actuation of the spool 33e. A spring 33g is arranged so as to urge the spool toward a position wherein the valve member 33d closes the valve port 33c and upon energization of the solenoid 33f the spool 33e is driven, against the bias of the spring 33g, to a position, as illustrated in FIG. 3, wherein the valve member 33d opens the valve port 33c.

The reference numeral 36 designates a controller containing a microcomputer. The operating condition of the engine is represented by sensing engine rpm and venturi vacuum, in this embodiment, although other combinations of indicia, such as engine rpm and induction vacuum Ps, or engine rpm and engine torque may be employed. Engine rpm sensor, in the form of a distributor, 41 and venturi vacuum sensor 42 are provided to feed their outputs to processor 37 where the sensor outputs are processed into the form to be processed by a computing unit 39. The computing unit 39 performs arithmetic logic and control logic, and issues results in the form of suitable data to be operated upon by a valve actuator 40. A predetermined EGR strategy, viz., the amount of flow of exhaust gas recirculation versus various engine operating conditions, is stored by a memory 38. The function of the computing unit 39 is to compare the data, indicative of the actual engine operating condition, with the information stored in the memory to determine the most suitable state of all of the ON-OFF valves 33, 34, 35, viz., a state of the ON-OFF valves 33, 34, 35 which yields the most suitable vacuum level in control vacuum Pc for producing the most suitable amount of flow of exhaust gas recirculation for the particular engine operating condition. In accordance with the results from the computer unit 39, the valve actuator 40 energizes selective one or ones of the ON-OFF valves 33, 34, 35.

Figure 4:
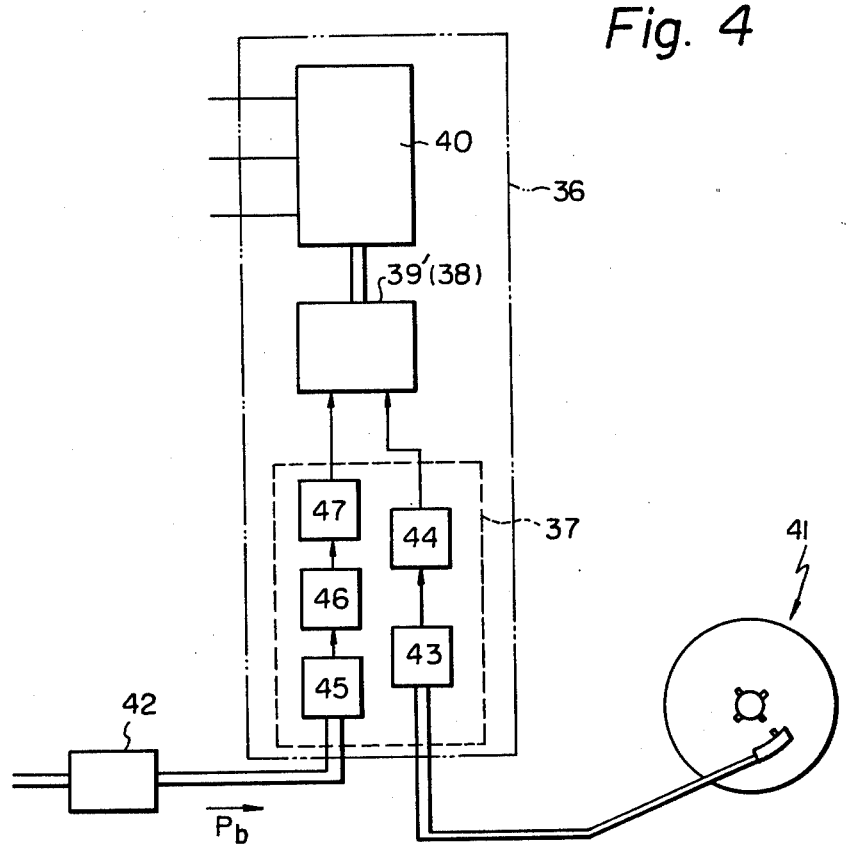
FIG. 4 is a partial view of FIG. 2 showing, in more detail, the controller.

Explaining furthermore as to the controller 36 particularly in connection with FIG. 4, a rpm signal from the distributor 41 is fed to a rpm detector 43, where the rpm signal is shaped, and fed through a X-adress decorder to a memory matrix 39' containing the function of the memory 38 (see FIG. 2). A venturi vacuum signal from the vacuum sensor 42 is fed through an analog-digital converter 45 to a venturi vacuum detector 46 where the venturi vacuum signal in digital form is shaped, and fed through a Y-address decorder 47 to the memory matrix 39'. The memory matrix 39' performs the same function as the computing unit in addition to the function as a memory.

Although in the embodiment thus far described a source of constant vacuum, in the form of surge tank 25 produces a constant vacuum based upon the manifold vacuum Ps within the EGR passage 4, such constant vacuum may be produced based upon another form of vacuum, if desired, such as a vacuum in the intake downstream of the throttle valve therein.

The operation of the system thus far described will now be explained hereinafter.

Opening degree of EGR control valve 6' and exhaust gas recirculation flow rate through EGR passageway 4 are determined by a difference between the atmosphere pressure and control vacuum Pc across diaphragm 20 since operation of EGR control valve 6' is determined by same. Control vacuum Pc varies in response to operating conditions of the internal combustion engine and has discrete values in response to different states assumable by the ON-OFF air valves 33, 34, 35.

If we assume that the orifice size of each of the orifices 32a, 32b, 32c has the following relationship that $32a<32b<32c$, possible states available by open or close state of the ON-OFF valves and variation of the control vacuum Pc and that of the exhaust gas recirculation flow are illustrated as follows.

| ON-OFF | No. | | | | | | | |
|---|---|---|---|---|---|---|---|---|
| valve | 1 | 2 | 3 | 4 | 5 | 6 | 7 | 8 |
| 33 | O | X | O | X | O | X | O | X |
| 34 | O | O | X | X | O | O | O | X |
| 35 | O | O | O | O | X | X | X | X |

The above Table shows the states available by the ON-OFF valves 33, 34, 35. From this it will be clear that if the number of ON-OFF valves are n, the number of available states can be given as $2^n$. In the Table O denotes that the ON-OFF valve is open thus permitting the associated branch passage to open to the atmosphere and X denotes that the ON-OFF valve is closed.

Figure 5:
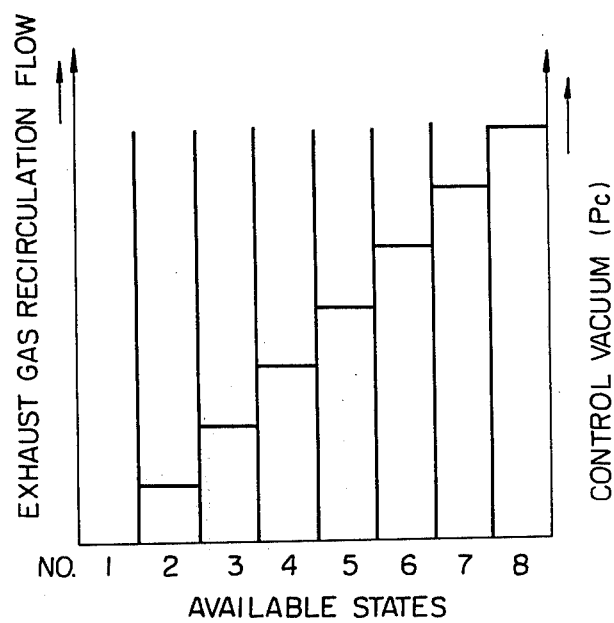
FIG. 5 is a graphical representation showing the relationship between the magnitude of a control vacuum and states which may be taken by a plurality of ON-OFF valves.

FIG. 5 shows different values in the magnitude of the control vacuum Pc and that of the exhaust gas recirculation flow as against the different states No. 1 to 8 (as in the Table). As will be readily understood, the magnitude of the control vacuum Pc and that of the exhaust gas recirculation flow enjoy the proportional relationship. It will be understood that any desired one of all the values in the magnitude of the control vacuum as shown in FIG. 5 can be selected if the corresponding one of the different states of the ON-OFF valves 33, 34, 35 is selected and thus the EGR flow rate can be adjusted to the target value exactly.

Of couse, a variety of different precise and sophiscated controls of EGR may be obtained if the number of ON-OFF valves is increased and the orifice size of the orifices differs among them.

If the controller 36 stores an information as to suitable states of ON-OFF valves 33, 34, 35 for possible operating conditions of an automobile, the ON-OFF valves 33, 34, 35 can jump to another state which is the most appropriate for a new operating condition of the automobile at the same time when the automobile plunges into the new operating condition, so that the EGR flow rate can be controlled to meet demands exactly over all operating conditions of the automobile since the ON-OFF valves 33, 34, 35 can assume the most appropriate state without any delay even if there occurs a rapid change in operating condition of the automobile, such as, when the automobile starts to decelerate rapidly from high speed running condition where the venturi vacuum Pb is extremely large and the induction vacuum Pa is small. Therefore, with the system thus described a drop in the fuel economy which would otherwise occur is prevented.

Since what is required, in the system thus far described, for the EGR control valve 6' is the possession of the function that the valve opening degree is determined only by or is a simple function of the magnitude of the control vacuum Pc, the construction of the EGR control valve can be simplified and miniturized, and another control valve, such as a pressure modulator valve, for controlling the control vacuum is unnecessiated.

What is claimed is:

1. An exhaust gas recirculation control system for an internal combustion engine, comprising:

an exhaust gas recirculation passage means for passing therethrough a portion of the exhaust gas issued from the internal combustion engine;

a source of vacuum;

an exhaust gas recirculation control valve including a control vacuum chamber communicating with said source of vacuum, said exhaust gas recirculation control valve being constructed and arranged such that it varies the degree of flow resistance in said exhaust gas recirculation passage means in response to a control vacuum within said control vacuum chamber;

a control passage means for providing communication between said source of vacuum and said control vacuum chamber;

said control passage means being formed with a plurality of holes which are spaced with each other in a longitudinal direction of said control passage means;

a valve system including a plurality of ON-OFF valves to open and close said holes, said valve system having $2^n$ different states, where: n denotes the number of said plurality of ON-OFF valves; and control means adapted to energize said plurality of ON-OFF valves selectively in accordance with operating conditions of the internal combustion engine.

2. An exhaust gas recirculation control system as claimed in claim 1, wherein said plurality of holes being arranged such that each state of said valve system corresponds to one value in the magnitude of said control vacuum within said control vacuum chamber so that $2^n$ different values may be taken by said control vacuum correspondingly to $2^n$ different states taken by said valve system.

3. An exhaust gas recirculation control system as claimed in claim 1, including a plurality of orifices to control flow of air admitted into said control passage means through said holes, respectively.

4. An exhaust gas recirculation control system as claimed in claim 1, the operating conditions of the internal combustion engine are represented by sensing engine rpm. and engine induction vacuum.

5. An exhaust gas recirculation control system as claimed in claim 1, the operating conditions of the internal combustion engine are represented by sensing engine rpm. and venturi vacuum.

6. An exhaust gas recirculation control system as claimed in claim 1, the operating conditions of the internal combustion engine are represented by sensing engine rpm. and engine torque.

7. An exhaust gas recirculation control system as claimed in claim 1, including:
   means for sensing indicia representing the operating conditions of the internal combustion engine; wherein said control means comprises:
   means for processing signals from said sensing means; and
   means for performing arithmetric logic.

8. An exhaust gas recirculation control system for an internal combustion engine, comprising:
   an exhaust gas recirculation passage means for passing therethrough a portion of the exhaust gas issued from the internal combustion engine;
   a source of constant vacuum;
   an exhaust gas recirculation control valve including a valve member fluidly disposed in said exhaust gas recirculation control passage means, a diaphragm operatively fixed to said valve member, a housing divided by said diaphragm into a control vacuum chamber and an atmosphere chamber and a spring urging said valve member toward a closed position thereof;
   a control passage means for providing communication between said source of constant vacuum and said control vacuum chamber;
   said control passage means being formed with a plurality of holes which are spaced with each other in a longitudinal direction of said control passage means;
   a valve system including a plurality of ON-OFF valves to open and close said holes, respectively, said valve system having $2^n$ different states, where:
   n denotes the number of said plurality of ON-OFF valves;
   said plurality of holes being arranged such that each state of said valve system corresponds to one value in the magnitude of said control vacuum within said control vacuum chamber so that $2^n$ different value may be taken by said control vacuum correspondingly to $2^n$ different states taken by said valve system.

* * * * *